(12) United States Patent
Shaikh

(10) Patent No.: US 7,035,830 B1
(45) Date of Patent: Apr. 25, 2006

(54) METHOD AND APPARATUS FOR REMOTE FILING AND RECORDATION OF DOCUMENTS

(76) Inventor: Mohammed Nasar S. Shaikh, 525 Borsian Way, Santa Barbara, CA (US) 93109

( * ) Notice: Subject to any disclaimer, the term of this patent is extended or adjusted under 35 U.S.C. 154(b) by 0 days.

(21) Appl. No.: 09/562,808

(22) Filed: May 1, 2000

(51) Int. Cl.
*G06F 17/60* (2006.01)

(52) U.S. Cl. .............................. 705/52; 705/67; 705/75; 713/170; 713/176; 713/178

(58) Field of Classification Search .................... 705/52, 705/67, 75, 77; 713/176, 178, 170, 155
See application file for complete search history.

(56) References Cited

U.S. PATENT DOCUMENTS

| | | | | |
|---|---|---|---|---|
| 5,486,686 | A | * | 1/1996 | Zdybel, Jr. .................. 235/375 |
| 6,182,219 | B1 | * | 1/2001 | Feldbau et al. ............. 713/176 |
| 6,185,683 | B1 | * | 2/2001 | Ginter et al. ................ 713/176 |

FOREIGN PATENT DOCUMENTS

JP 9-81517 * 3/1997

OTHER PUBLICATIONS

Shillinford, J., "Survey of Info . . . Electronic Office", Mar. 23, 1993.*

Markoff, J. "Experimenting . . . Cipher", Jan. 1992.*

* cited by examiner

*Primary Examiner*—Dean T. Nguyen
(74) *Attorney, Agent, or Firm*—Randall L. Reed

(57) ABSTRACT

A document filing method and system is disclosed that utilized has: a user interface display connected to a server in electronic communication with at least one remote compute engine with URL capability, the server being adapted to receive and display an electronic copy of a document submitted from a remote location for filing with the user of the server; an electronic stamping apparatus adapted to impart an electronic stamp on the submitted document responsive to a user input through the user interface; a database in electronic communication with the server and the user interface is adapted to store the document after the electronic stamp is imparted to the document; and a communication device is adapted to transmit an electronic copy of the document to the submitter with electronic stamp imparted to the electronic copy of the document. The electronic stamp can indicate that the document is accepted or rejected. The system can provide for an electronic fee payment mechanism. A security mechanism includes limiting the software for imparting the electronic stamp to the electronic copy of the document being filed to running on the server only, without upload to any other compute engine, and limiting access to the server to at least one authorized user uniquely identified to the server prior to use of the electronic stamp. Assuring authenticity of the electronic stamp by storing the electronic document in a form that limits access and/or modification.

26 Claims, 5 Drawing Sheets

METHOD AND APPARATUS FOR REMOTE FILING AND RECORDATION OF DOCUMENTS

FIELD OF THE INVENTION

The present invention relates to the field electronic document receipt and acceptance and recordation and filing.

BACKGROUND OF THE INVENTION

Electronic commerce has created the potential for converting conventional buying into a web-based electronic buying process. The cashier's counter has been changed into an electronic shopping cart and electronic payment system. However, there are situations where the payment is for other than goods, e.g., for the filing, recordation, registration or the like of certain types of documents. In such cases, the cashier's counter serves more than simply to link payment to the contents of a virtual shopping cart. The content of the documents involved may have an impact on the completion of the transaction in a certain fashion, e.g., local, state and federal laws and/or rules associated with the proper completion of the document. There exists a need to accomplish this type of transaction electronically utilizing Web-based remote access technologies and to record, permanently memorialize, and communicate the results of the prospective transaction, i.e., was it completed or unsuccessful.

SUMMARY OF THE INVENTION

A document filing method and system is disclosed in which is utilized a user interface display connected to a server in electronic communication with at least one remote compute engine having URL capability, the server being adapted to receive and display an electronic copy of a document being submitted from a remote location for filing with the user of the server; an electronic stamping apparatus is also used, which is adapted to impart an electronic stamp on the submitted document responsive to a user input through the user interface; a database in electronic communication with the server and the user interface is adapted to store the document after the electronic stamp is imparted to the document; and an electronic communication device is adapted to transmit an electronic copy of the document having the electronic stamp imparted to the electronic copy of the document to the submitter of the document for filing. The electronic stamp can indicate that the document is accepted or rejected. The system can provide for an electronic fee payment mechanism adapted to charge the submitter of the document a fee for the acceptance of the filing of the document. A security mechanism includes limiting the software for imparting the electronic stamp to the electronic copy of the document being filed to running on the server only, without upload to any other compute engine, and limiting access to the server to at least one authorized user uniquely identified to the server prior to use of the electronic stamp. Authenticity of the electronic stamp can be assured by storing the document in a form that prevents further modification and/or with access limited to purposes other than making any further changes to the image constituting the stored form of the document. In addition, the document may be transmitted to the submitter of the document for filing in such a non-modifiable form.

After the electronic stamping, documents should inform the sender as to acceptance or rejection of the document using an electronic return receipt. The electronic stamp is also made permanent so that it cannot be altered and an imprint of a Facsimile signature added to the document. The electronic stamping application replaces the existing court counter with an electronic court counter and constantly communicates with the server to inform the court clerk of the number of people waiting in line to have a filing entered into the system. This pushes the information of the number waiting to the user.

DETAILED DESCRIPTION OF THE PREFERRED EMBODIMENTS

The present invention enables persons wishing to make a filing of a document, e.g., with a governmental agency, e.g., an attorney filing a pleading with a court, to electronically file the document as if the filing were done in person, e.g., by an attorney courier service, as is commonly done today. Documents so filed, according to the present invention may be filed electronically from any site in the world having a compute engine with URL capability to a governmental agency location, e.g., a courthouse having a server running a Web-page, or having a link to a server running a Web-page, according to the present invention.

The present invention can be owned and operated directly by the governmental agency in question, e.g., by the office of the clerk of a court, or provided to the agency as an out-sourced service, either maintained locally at the specific agency site or otherwise within the agency, or remotely at the provider's site. The present invention can interface with both the agency's computer processing and database management systems and through the web-page at the agency with users of the agencies services and/or applicants to register with or record information contained in documentation with the agency. This could include, e.g., attorneys who use the service via Web sites on the Internet for filing documents at a courthouse, through the Web-page of the courthouse or the provider. The present invention creates a communications link between the remote user, e.g., an attorney and the court system, e.g., a specific courthouse clerk's office, as an Intranet.

The system of the present invention can be installed at locations of the governmental agency where filings are normally accepted and acknowledged in some paper fashion, and its utilization may be paid for by a portion of the fees' charged for making the filing or recordation of registrations electronically by use of the system. Users of the system can be charged, e.g., through a usage charge that is electronically billed to the user's authorized credit card(s) or checking account, as is commonly done in the art of electronic commerce. Public access can be allowed according to the present invention in read-only mode for reviewing electronic versions of documents that have been submitted to the respective agency for filing utilizing the present invention, again via the Web, and for the charge of an appropriate fee.

Figure 1:
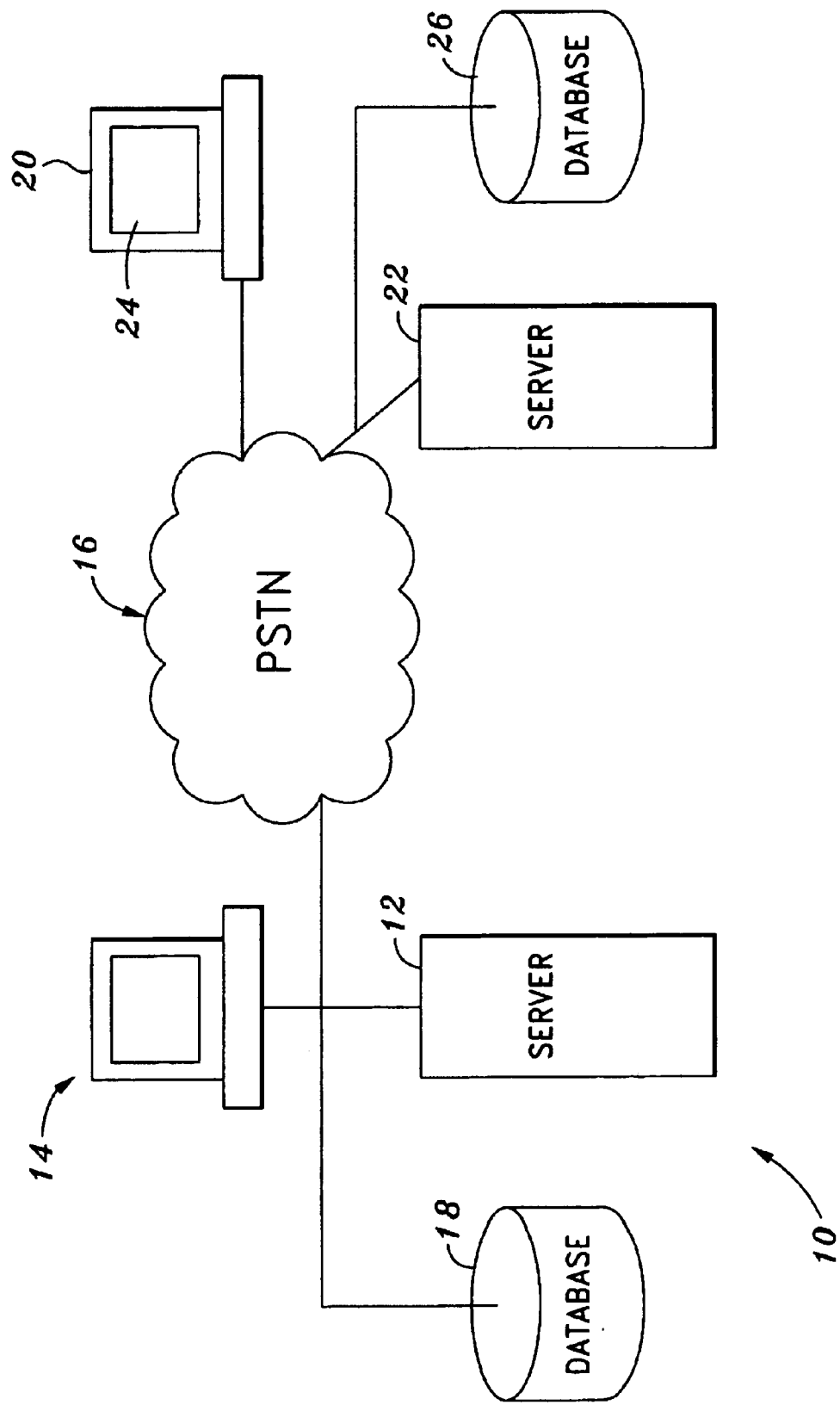
FIG. 1 is a block diagram of a system according to the present invention.

Turning now to FIG. 1 there is shown a schematic block diagram of a system 10 according to the present invention. The system 10 employs at least one server 12 which is connected to a user interface terminal 14 and is also connected to a network 16, which can be an intranet within the government agency in question or within the particular facility of the government agency, an Internet, e.g., the Worldwide Web ("www."), or an extranet, combining the two, or any other network communications system, e.g., a LAN or WAN which is adapted for communicating between Uniform Resource Locator ("URL") sites, including also, at least in part, the Public Switched Telephone Network ("PSTN"), wired and/or wireless, herein simply referred to, unless specifically delineated separately, as a network of the Web. It will be understood that the server 12 could be a part of the information technology system of the agency, and located at the specific agency site where document filing is required, or remotely within the agency, or can be at the provider's site remote from any agency site, and linked to the specific agency site where document filing is required over the Web.

The at least one server 12 acts as a librarian for the system 10 as well as a gateway for the system 10. The server can act as a librarian of the system by allowing access to the system only to authorized users in respective different modes, e.g., submission, review and approval, and file access, as will be more specifically described below. The server 12 can be set up to allow access to its associated databases 18 or linked databases (not shown) only to authorized individuals from a particular agency or more limited to only a particular facility for the agency or even a specific office within the specific facility, e.g., the office of the clerk of the court for a particular courthouse facility. It could allow all authorized users to access its database(s) 18 for a single court or multiple courts. It could also allow a scope of access for one mode, e.g., read only that is broader in scope that access for read/write for purposes of review and acceptance of the document being submitted for filing. The server 12 can also maintain the related files for the particular agency, e.g., the active case file, which contains documents in the files of the various cases pending before the court. The present invention can also act as a gateway system through which remote users, e.g., attorneys, interface to the system of the present invention, and, therefore, also with the particular agency, e.g., court. The present invention can make use of a secure Web-site on the Web, maintained, e.g., by the server 12 which is itself made secure as is well known in the art. The system 10 can also provide, e.g., that all information passed between remote users, e.g., attorneys, and the government agency, e.g., the court system, is encrypted. The server 12 also stores the necessary data as well as the document(s) submitted by the sender.

The present invention can also provide for a level of security by limiting access to the system 10 for the different modes of operation to registered users and other authorized individuals. Remote users, e.g., an attorney desirous of filing a document with the court must have registered with the government agency as someone who from time to time will submit papers for filing. The registration can be directly through the respective government agency, e.g., through a Web-site for the agency/agency facility in question, i.e., directly through the server 12 in question, or through a Web-site run by the provider of the present invention to the agency, where the server 12 could be located. The registered remote user could be required to provide a profile, which would be utilized to authorize certain types of access to the server 12. The server 12, according to the present invention can maintain such profiles (account records) of all remote users, e.g., registered attorneys. In use of the present system, a document can be remotely sent to the Web-page supported at the government facility or at the provider by the server 12, along with a set of identification (ID) information, which can reflect information previously provided as part of the user profile, including, e.g., electronic billing information. This can be done, e.g., through the remote user's PC 20.

The server 12 can be adapted to respond to the receipt of such a document by imparting an electronic date stamp to the document, automatically upon such submission with a valid set of profile information, including a valid electronic charging method, e.g., the identification of the remote user's credit card or charge account with the agency. In so doing, the server 12 can provide a time/date stamp recorded on the electronic copy of the document that the server 12 then proceeds to store in the associated database 18. The document may then be held as an image, e.g., a .pdf image or a TIFF image file, or the like, within a database of such images of documents maintained by the server 12. The document may be searchable by a full text search engine running on the server 12 at the agency or at the Web-site of the provider of the present invention to the agency. Search authorization may be limited to registered users.

The server 12, according to the present invention may maintain a communications link with an established credit card clearinghouse through which it may request and receive authorization and payment for associated charges and fees paid by, e.g., the attorney for the filing or other processing of the document by the agency. Such electronic payment transactions are commonly used in electronic commerce today. In addition, as is well known today, the server 12, according to the present invention may be protected behind a firewall system that checks for incoming computer viruses, and further assures that unauthorized users cannot access the system 10 of the present invention.

Registered users, e.g., attorneys may utilize the system of the present invention either directly and wholly electronically or indirectly and partly electronically. Each attorney must register with either the agency in question or the provider of the present system to the agency, or both, e.g., by completing an Attorney Profile form.

Registration could be done, e.g., via the Internet or, in a more traditional manner, by filling out a form and faxing or mailing it to the agency and/or the provider. The information in the Attorney Profile may include, e.g. the user name, and contact information including E-mail (if available). Also the user can be required to include at least one credit card or check/charge account authorization that will be used to cover the associated fees, e.g., court filing fees and associated system use charges. A particular identifying portion of the profile, e.g., an attorney's Bar Number can be used as a unique identifier of the particular remote user. The remote user, e.g., an attorney may also be given or may choose a unique log-in identification (password, PIN, etc.) which, along with the unique identifier, authenticates permissible access to the system 10 of the present invention. If the attorney is submitting his/her documents via the Internet, the attorney can have the ability to make such actual submissions paperless because documents being so filed never have to be committed to paper.

As an example, a remote user, e.g., an attorney can create a motion or petition to the court in his/her office using the remote PC 20. The document can be prepared using any word-processing software currently available, e.g., for Windows 95 or Windows NT. Such a document is hereinafter referred to as the "document envelope" and can include other documents such as Excel, .pdf, etc. files, created by using multiple applications at the remote PC 20. Attorneys using other operating systems such as Macintosh can also create a document envelope using different applications. The remote user, e.g., the attorney, once the document is completed and still on the remote computer system 20, could locally print out any page or pages that need a signature. The signed pages could then be rescanned back into the electronic copy of the particular document or could be attached to the unsigned electronic copy of the document. Alternatively, the electronic copy of the document could be electronically signed, utilizing, e.g., a "Signature Pen Pad," supplied by Microsoft, or like electronic signature device available on the market. Additional required signatures, including, e.g., clients or other individuals whose signatures must appear on selected documents, can be captured in the same manner.

Figure 2:
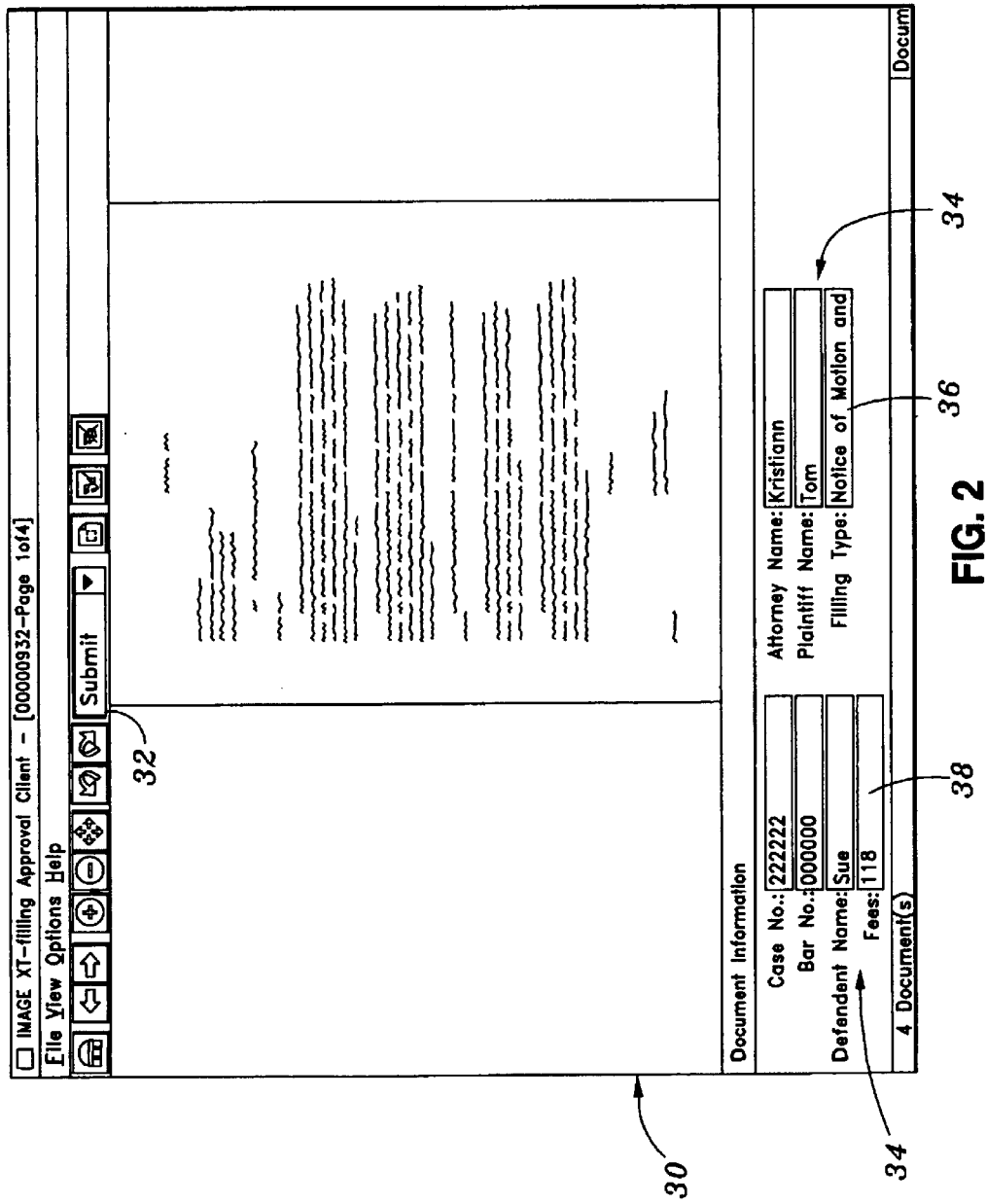
FIG. 2 is an illustration of a Web-browser screen user interface according to the present invention.
Figure 3:
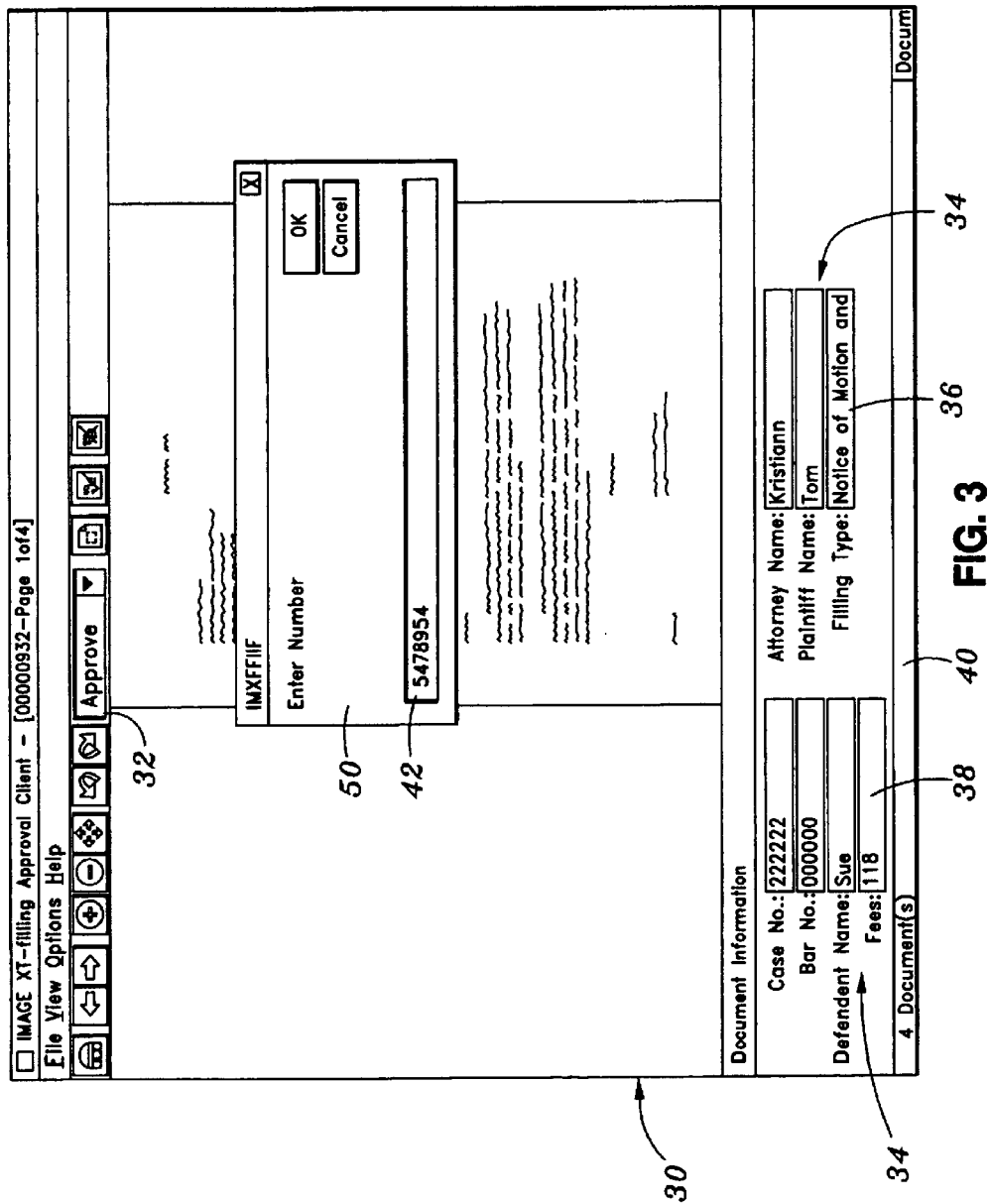
FIG. 3 is an illustration of another user interface according to the present invention.

When the remote user, e.g., the attorney, or someone from his or her staff, is ready to send the document to the agency, e.g., the court, he/she can log onto a Web-site maintained by the server 12 at the agency or at the provider of the present invention to the agency, which could also be served by a separate provider's server 22, in either case via the Web. The remote user will be presented on his/her screen 24 a web-browser page similar to the Web-browser page 30 shown in FIG. 2, with the exception that an options button pull-down menu 32 will not have the function selections that the agency user would have, e.g., "accept" and "reject." From the Web-page 30 displayed at the remote user's PC 20, the remote user will be able to select from a plurality of agency locations, e.g., courthouses equipped with the present invention, and select, e.g., the state and county of the court to which the case is assigned, or to which it is desired to initially file a case. Next the user can prepare the filing identification (ID) page information. The ID page information 34 includes the case number, if this is not the initial filing of a complaint, the party filing the motion or like document, the attorney's name and the bar number, the plaintiffs name, the defendant's name and other required information, hereinafter referred to as the data envelope. If the filing is to a new a case, the case number is left blank. The remote user, e.g., the attorney can identify the nature of the document being submitted, e.g., a motion by selecting from the various menu options provided in, e.g., a pull-down menu 36. The required filing fees and authorization to charge the remote user for the fee can be indicated, e.g., as shown at 38 in FIG. 2. All of this input from the remote user can be made through the use of input prompt screen inserts, such as the insert 50 shown in FIG. 3. The remote user may be given the option of selecting same day processing or next day processing. Utilizing the remote user client application, running, e.g., on the law firm's PC 20, the remote user can select the file to be sent, attach scanned exhibits and/or signature pages or the like, and initiate the electronic transfer process. A click of the mouse button and the documents are on their way. If indirect filing through a provider is done, then an operator at the provider can similarly submit documents sent to and stored at the provider server 22, or perhaps be given access to the customer's PC files in order to upload the appropriate document file(s) for filing with the agency.

When the ID page information is complete, and the document is submitted, e.g., for filing, the server 12 or the server 22 can obtain authorization for the charges and filing fees. Then, if the filing is made indirectly through the provider server 22, a tracking or ID number may be assigned to the document prior to the filing of the document. The server 12 or the server 22 can notify the remote user, e.g., the attorney that it has successfully received the filed document or successfully submitted the document to the agency's server for filing. The time and date is recorded in the agency database 18 and/or a provider database 26. Once received by the server 18, 22, the document is maintained as an image, e.g., a .pdf image or a TIFF image. The server 12, 18 also may receive a separate back-up text file of the text content of the word processing application file.

Figure 4:
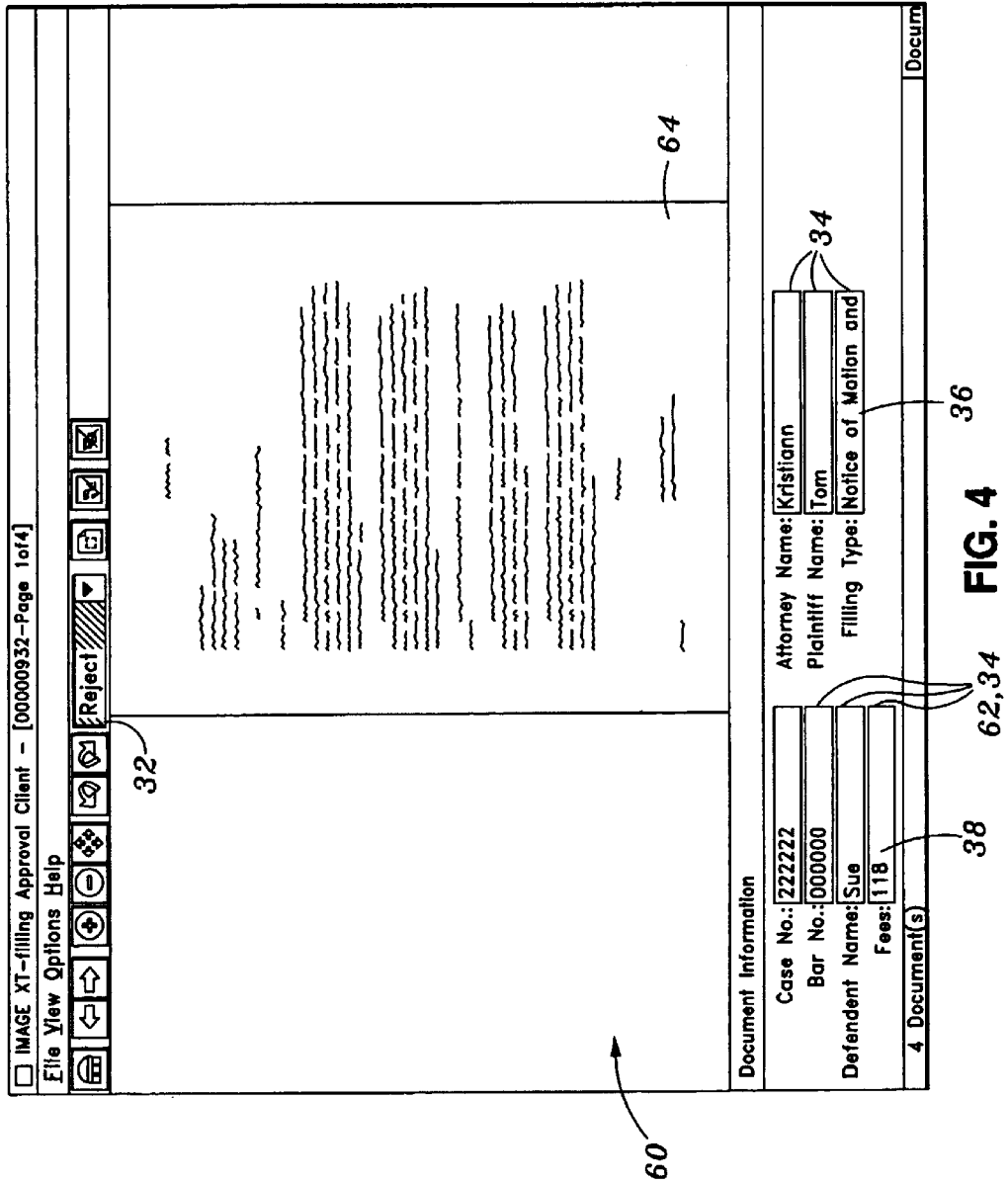
FIG. 4 is an illustration of another user interface according to the present invention.

The server 12, 22 may be set up to prompt an agency authorized user to the fact that a document has been received for electronic filing. When the authorized agency representative, e.g., the clerk of the court or an authorized individual from the office of the clerk, is ready the authorized individual can log into the server 12, 18 to review any documents submitted electronically, e.g., by remote user attorneys. Access to log on to the server 12, 22 may be limited to a specific individual(s) uniquely identified to the server by a unique identifier, e.g., an employee badge number and, e.g., a PIN or password. He/she will first see an ID page 60 as shown in FIG. 4. This Web-browser page contains the ID page information data blocks 62 as shown in FIG. 4, and as completed by the remote user attorney(s) since the last log-in session by the authorized agency user. He/she can review the information contained on each ID page information block locations 62 for each newly submitted document, and, if necessary, also call up the document 64 for review. The authorized agency user, e.g., the court clerk, then may do one of several three things related to the document, following this review. The clerk may accept the document as filed, modify some portion(s) of the ID page information and then accept the document, or reject the document because of error(s) in the filing.

If the document is accepted, the server 12, 22 interfaces with the agency database 18 and/or the provider database 26 to, e.g., in the case of a court, update the court's case management system by entering an event of the filing of the document into the court docket for the case to which the filing was submitted; post to the court's general ledger any filing fees authorized for payment by the submission; alert the respective courtroom of the event of the filing relevant to one of its cases; make a Time/Date log entry in the database 18, 26 recording the event of the filing; print one or more hard copies of the document for traditional filing (if appropriate and necessary); change the status of the document, i.e., from simply submitted to filed; and, contact the credit card clearinghouse requesting payment of the previously authorized charge. In the case where the filing was indirectly done through the provider, the provider's server 22 can be contacted to update the database 26 associated with the provider's server 22 in like manner. If the authorized agency person, e.g., the court clerk, rejects the document for filing, the authorized agency person can generate a free-form text message stating the reason for rejection.

Figure 5:
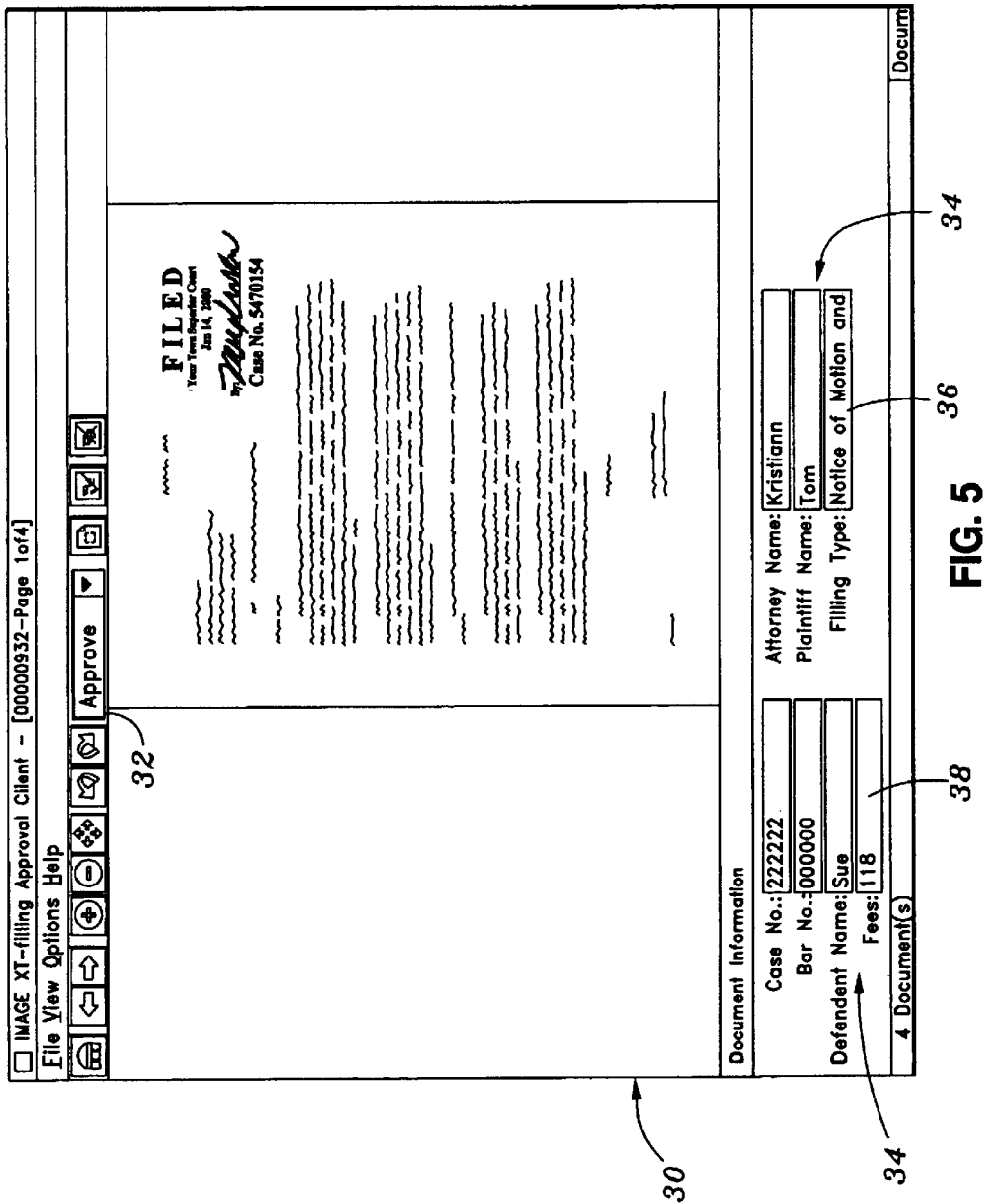
FIG. 5 is an illustration of another user interface display according to the present invention.

In the former event, the authorized agency person can impart to the document being stored in the database an electronic filed stamp, as for example is shown in FIG. 5. The electronic "Filed" stamp is permanently imparted to the document 64 within the database, and once the electronic "Filed" stamp is so imparted the document 64 can be made inaccessible by anyone, including the authorized agency individual, except in read-only mode, in order to preserve the integrity of the filing process in the light of utilizing electronic stamping, as explained herein. Similarly the document can be marked with an electronic "Rejected" stamp (not shown) if appropriate.

The remote user, e.g., the attorney, can be automatically notified, e.g., by E-mail, electronic return receipe, that the document was accepted for filing or rejected. When the attorney next reviews his/her document status screen and sees the rejection, he/she can immediately correct and resubmit it. Payment of filing fees and associated system transaction charges can be electronically transferred (EFT) from the credit card clearinghouse directly into the agency bank account, or into a provider bank account. In the latter event, the funds due the court can then electronically be transferred from the provider account to the agency account. The system can provide to agency personnel responsible for reconciliation of the agency's bank records with statements of the fees and charges, or these can be provided from the server 22 associated with the provider's database 26. This information is available for printing to hard copy. With the system 10 of the present invention, remote users, e.g., attorneys can call up the file documents in the database 18, 26 to review the file, rather than keeping unnecessary paper copies in the attorney's files. Additionally such requests can be made to review any public record documents in the electronic files of the agency, e.g., the court. Just as documents can be labeled read-only after a filing stamp has been imparted to the document, so too, certain documents, e.g., those filed in confidence with the agency, e.g., filed under seal with a court, may be marked to deny even read-only access to members of the public not authorized to view the documents in the court's records.

The present invention can also provide for certain types of automated management reports for use by the agency and/or remote user customers, e.g., in reconciling documents and fees. In addition the system also provides a document/image vault to store and allow for searching of the files, using, e.g., text as well as key work abstract/field searches. All management reports can be made available, e.g., through on-screen formats displayed, e.g., on the agency computer 14 or the remote user's computer 20. These may also be printed to hard copy. These management reports could include lists of, e.g., all documents submitted that have already been reviewed by the court; all documents filed within a case by sorting by case number, along with, perhaps a date range, etc., statistical information, which can be collected relating to quantity and type of filings into the court, etc.; including, e.g., fees collected and paid to the court. The system 10 according to the present invention can also be utilized with other equipment and systems, e.g., scanning of documents received on paper over the clerk of the court's traditional counter can be combined with the present invention to keep all of the court's file records electronically; providing for secured remote access for judges to view the electronic files, e.g., from home or on the road; providing for full text search capabilities for documents and case summary files; providing the ability for attorneys to link supporting information with his/her document using hypertext into other documents, web-sites and the like; providing attorneys with the ability to electronically record system transaction charges and court filing fees to their practice management system or into a spreadsheet format, and providing electronic or digital signature capability. Another utilization of the present system could be for the filing of a document which requires agency action and after which the document acquires a different status, e.g., an order originally simply filed with the court as a proposed order becomes an order of the court, when and if signed by the court. If the remote user, e.g., the attorney files an order utilizing the system of the present invention, and has prepared the order for the judge's signature, that order may be reviewed and modified and the judge is enabled to electronically sign the order or its modified version. After this the order can be reentered into the electronic document system with its changed status as an outstanding order of the court. The courtroom clerk also can attach the required Certificate of Mailing, and the now automatically time/date stamped order can be electronically returned to the attorney. The court docket can be automatically updated to show the signed order as an event. Also after a case has been finalized and considered closed, the court can establish a procedure, utilizing the present invention to archive the case. Archived cases may be moved onto other electronic media (Optical, CD-ROM, DVD) and such media can be maintained by the agency or by the provider. Enclosed is a copy of the source code for the implementation of the above disclosed invention, incorporated herein by reference.

I claim:

1. A document filing method comprising the steps of:
using a user interface display connected to a server in electronic communication with at least one remote compute engine having URL capability, the server receiving and displaying an electronic copy of a document being submitted from a remote location for filing with the user of the server;
electronically stamping the electronic copy of the document being submitted for filing responsive to a user input through the user interface;
storing in a database the document after the electronic stamp is imparted to the document;
providing an electronic communication transmitting an electronic copy of the document having the electronic stamp imparted to the electronic copy of the document to the submitter of the document for filing
providing, as a security measure, that the electronic stamping step can only be done utilizing software running on a secure server system with access for the purpose of such electronic stamping limited to at least one authorized user uniquely identified to the server prior to performing the electronic stamping step.

2. The method claim 1 further comprising:
the electronic stamp indicating that the document is accepted.

3. The method of claim 1 further comprising:
the electronic stamp indicating that the document is not accepted.

4. The method of claim 1 further comprising:
using an electronic fee payment mechanism to charge the submitter of the document a fee for the acceptance of the filing of the document.

5. The method of claim 1 further comprising the steps of:
assuring authenticity of the electronic stamp by storing the document in a form that prevents further modification and/or storing the document with access limited to purposes other than making any further changes to the image constituting the stored form of the document.

6. The method of claim 5, further comprising the step of:
transmitting an electronic copy of the document with the electronic stamp imparted to the document to the submitter of the document for filing, which electronic copy is in a non-modifiable form.

7. The method of claim 1 wherein, the received electronic copy of the document is in one or more of multiple formats, including the a spread sheet format, an image format, and a word processing format.

8. The method of claim 1 wherein, the received electronic copy of the document is in one or more of multiple formats, including Excel, .pdf and word.

9. The method of claim 1 wherein the electronic stamp includes the document envelope the data envelope and the content of the document.

10. The method of claim 1 wherein the electronic stamp displays the document envelope, the data envelope and the content of the document.

11. A document filing system comprising:

A user interface display connected to a server in electronic communication with at least one remote compute engine having URL capability, the server being adapted to receive and display an electronic copy of a document being submitted from a remote location for filing with the user of the server;

an electronic stamping apparatus adapted to impart an electronic stamp on the submitted document responsive to a user input through the user interface;

a database in electronic communication with the server and the user interface and adapted to store the document after the electronic stamp is imparted to the document;

an electronic communication device adapted to transmit an electronic copy of the document having the electronic stamp imparted to the electronic copy of the document to the submitter of the document for filing a security mechanism including limiting the software for imparting the electronic stamp to the electronic cony of the document being filed to running on the server only, without upload to any other compute engine, and limiting access to the server to at least one authorized user uniquely identified to the server prior to use of the electronic stamp until approval or rejection.

12. The system of claim 11 further comprising:

the electronic stamp indicating that the document is accepted.

13. The system of claim 11 further comprising:

the electronic stamp indicating that the document is not accepted.

14. The system of claim 11 further comprising:

an electronic fee payment mechanism adapted to charge the submitter of the document a fee for the acceptance of the filing of the document.

15. The system of claim 11 wherein, the received electronic copy of the document is in one or more of multiple formats, including the a spread sheet format, an image format, and a word processing format.

16. The system of claim 11 wherein, the received electronic copy of the document is in one or more of multiple formats, including Excel, .pdf and word.

17. The system of claim 11 wherein the electronic stamp includes the document envelope the data envelope and the content of the document.

18. The system of claim 11 wherein the electronic stamp displays the document envelope, the data envelope and the content of the document.

19. A document filing system comprising:

A user interface display means connected to a server means in electronic communication with at least one remote compute engine having URL capability the server means being for receiving and displaying an electronic copy of a document being submitted from a remote location for filing with the user of the server;

an electronic stamping means for imparting an electronic stamp on the submitted document responsive to a user input through the user interface means;

a database means in electronic communication with the server means and the user interface means for storing the document after the electronic stamp is imparted to the document;

an electronic communication means for transmitting an electronic copy of the document having the electronic stamp imparted to the electronic copy of the document to the submitter of the document for filing a security means including a means for limiting the electronic stamp means for imparting the electronic stamp to the electronic copy of the document being filed to running on the server means only, without upload to any other compute engine, and for limiting access to the server means to at least one authorized user uniquely identified to the server prior to use of the electronic stamp.

20. The system of claim 19 further comprising:

the electronic stamp indicating that the document is accepted.

21. The system of claim 19 further comprising:

the electronic stamp indicating that the document is not accepted.

22. The system of claim 19 further comprising:

an electronic fee payment mechanism adapted to charge the submitter of the document a fee for the acceptance of the filing of the document.

23. The system of claim 19 wherein, the received electronic copy of the document is in one or more of multiple formats, including the a spread sheet format, an image format, and a word processing format.

24. The system of claim 19 wherein, the received electronic copy of the document is in one or more of multiple formats, including Excel, .pdf and word.

25. The system of claim 19 wherein the electronic stamp includes the document envelope the data envelope and the content of the document.

26. The system of claim 19 wherein the electronic stamp displays the document envelope, the data envelope and the content of the document.

* * * * *